United States Patent [19]

Crapo

[11] Patent Number: 4,858,044

[45] Date of Patent: Aug. 15, 1989

[54] DISC DRIVE SPINDLE MOTOR WITH LOW COGGING TORQUE

[75] Inventor: Alan D. Crapo, Santa Cruz County, Calif.

[73] Assignee: Seagate Technology, Inc., Scotts Valley, Calif.

[21] Appl. No.: 115,268

[22] Filed: Oct. 30, 1987

Related U.S. Application Data

[63] Continuation-in-part of Ser. No. 46,234, May 4, 1987.

[51] Int. Cl.$^4$ .................. G11B 17/00; H02K 3/00; H02P 7/00
[52] U.S. Cl. .................. 360/99.08; 310/268; 318/254
[58] Field of Search .................. 360/97–99, 360/99.08; 310/68, 156, 268; 318/138, 254

[56] References Cited

U.S. PATENT DOCUMENTS

| | | | |
|---|---|---|---|
| 4,528,485 | 7/1985 | Boyd, Jr. | 318/138 |
| 4,535,276 | 8/1985 | Yokobori | 318/138 X |
| 4,578,606 | 3/1986 | Welterlin | 310/268 X |
| 4,605,874 | 8/1986 | Whiteley | 310/268 |
| 4,626,727 | 12/1986 | Janson | 310/156 |
| 4,633,149 | 12/1986 | Welterlin | 318/138 X |
| 4,707,645 | 11/1987 | Miyao et al. | 310/268 X |

*Primary Examiner*—John H. Wolff
*Attorney, Agent, or Firm*—Flehr, Hohbach, Test, Albritton & Herbert

[57] ABSTRACT

A disc drive spindle motor having a stator with nine evenly distributed windings separated by relatively large slot openings, further comprises a rotor having a radially polarized eight-pole magnet. The motor of this invention has three phases, the first phase starting at any winding end of the nine windings and incorporates the windings n, n+2 and n+4 connected in series and being wound in the same direction; the second phase starting at the winding n+3, and incorporating the windings n+5 and n+7 connected in series and being wound in the same direction; and the third phase beginning with the winding n+6 and incorporating the windings n+8 and n+1, connected in series and wound in the same direction. The starting points of the three phases are selected to provide the necessary 120° phase shift between windings.

21 Claims, 6 Drawing Sheets

FIG.-4

| PHASE A | 1 | 3 | 5 |
| PHASE B | 4 | 6 | 8 |
| PHASE C | 7 | 9 | 2 |

DISC DRIVE SPINDLE MOTOR WITH LOW COGGING TORQUE

CROSS-REFERENCE TO RELATED APPLICATION

The motor of this invention is especially useful in disc drives of the type described in U.S. application Ser. No. 914,690 filed Oct. 2, 1986, entitled "Rotary Actuator" and incorporated herein by reference. This application is a continuation-in-part of U.S. application Ser. No. 46,234, filed May 4, 1987.

This invention relates generally to the field of electrical generator or motor structures, and more particularly to rotary magnetic motors and the construction of rotors and stators therefor.

BACKGROUND OF INVENTION

The common objective of all disc drive manufacturers is to design smaller, quieter disc drives having greater storage capacity, while minimizing manufacturing costs.

As is well known, disc drives record and reproduce information on a constantly rotating disc or discs. Many disc drives, to maximize their capacity, are now made with multiple discs rotating on a single spindle. It is essential to the proper operation of the disc drive that the spindle motor which rotates the spindle and the discs be capable of smoothly and immediately starting the disc in rotation, bringing it up to a constant rotational speed, and maintaining that rotational speed under all operating conditions. In order to meet this objective, it is necessary to provide a spindle motor having a high starting torque. This is achieved by providing a motor design wherein the minimum torque at any angular position is as high as possible. Further, during continuous speed operation, the motor must have a good fixed average torque. These operating conditions are normally expressed as requiring a motor with a low torque ripple.

A critical problem in achieving low torque ripple is the existence of cogging torque. Cogging torque occurs when the lines separating the poles of the magnet line up with the slot openings between the coils, or windings of the stator. A number of prior art approaches have been taken to minimize the cogging torque and thereby provide a motor with a low torque ripple. One prior art approach is to provide a magnet with a skewed magnetic pattern. However, the result of such a design is a degradation in several of the other operating characteristics of the motor. Another approach commonly taken is to provide very thin slots between adjacent motor windings on the stator. However, this makes the motor extremely difficult to wind.

SUMMARY OF INVENTION

It is an objective of this invention to provide a motor which is especially useful as the spindle motor in a disc drive having a low torque ripple. More particularly, it is an objective herein to provide a spindle motor wherein the cogging torque is minimized.

A further objective herein is to provide a motor for a disc drive in which the windings may be wound on the stator laminations very efficiently by virtue of the fact that the slots are relatively wide. In view of the discussion above, however, it is also necessary to provide a design wherein, although the slots between adjacent windings are wide, the cogging torque remains low.

A further objective is to provide a disc drive spindle motor that makes very efficient use of the copper wire, steel, and the magnets which make up the rotor and stator of the motor, while maintaining a low cogging torque.

These and other objectives of this invention are achieved in a disc drive spindle motor, comprising a stator having nine evenly distributed windings separated by relatively large slot openings, the motor further comprising a rotor having a radially polarized eight-pole magnet. Rather than use a spatially evenly distributed winding arrangement, as would normally be expected, the motor of this invention has three phases, the first phase starting at any winding end of the nine windings and incorporates the windings n, n+2 and n+4 connected in series and being wound in the same direction; the second phase starting at the winding n+3, and incorporating the windings n+5 and n+7 connected in series and being wound in the same direction; and the third phase beginning with the winding n+6 and incorporating the windings n+8 and n+1, connected in series and wound in the same direction. The starting points of the three phases are selected to provide the necessary 120° phase shift between windings. It has been found that the use of this winding sequence in a nine-slot, eight-pole motor provides a motor with extremely low torque ripple and minimal cogging torque.

In one embodiment of the invention, the magnet is carried in the hub which will support the discs on its outer surface. The hub then achieves a constant rotational speed with the switching of currents in the stator coils. In an alternative design, the central shaft is fixed in the base casting; the upper and lower bearings support the hub for rotation. The inner races of upper and lower bearings are fixed to the stationary shaft, above and below the stator laminations and coils.

In another alternative embodiment, the rotor and stator of the spindle motor are located below the baseplate of the housing. The coils are placed in a fan-like array below the base casting. A cup-shaped rotor casting including an annular magnet rotates around the stator. The rotor is fixed to the central spindle shaft and passes up through the base casting, the hub being fixed to this shaft for rotation with the rotor.

BRIEF DESCRIPTION OF DRAWINGS

The features and advantages of this invention may be better understood by referring to the accompanying drawings, wherein.

DETAILED DESCRIPTION OF PREFERRED EMBODIMENT

Figures 1, 2:
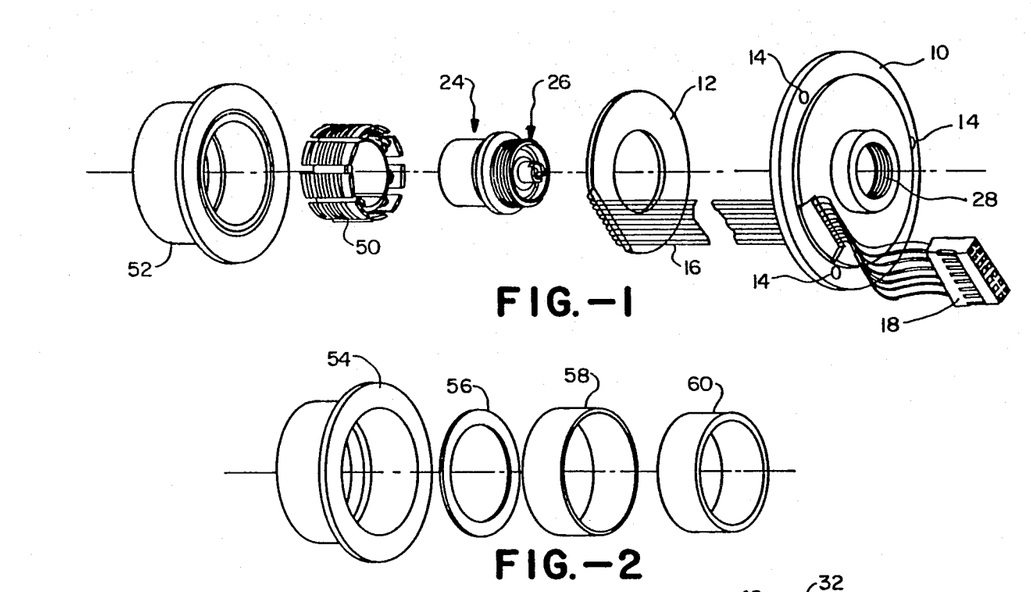
FIG. 1 is an exploded view of the spindle motor herein.
FIG. 2 is an exploded view of the elements of the rotor herein.

Referring to FIG. 1, the primary elements of a motor useful especially for mounting in a disc drive to drive the spindle and rotate the disks at a constant speed are shown. The motor is adapted for mounting on a base casting 10 that has a printed circuit board 12 mounted thereon. The base casting 10 can be fastened to the base housing of a disc drive to permanently seat the spindle motor in the base of the housing; to this end, screw holes 14 are provided in the edge of the base casting 10. Alternatively, by providing a threaded opening of the proper diameter in the base casting itself, the spindle motor designed in accordance with this invention may be mounted directly in the base casting. Electrical signals for controlling the position of the motor reach this printed circuit board 12 and specifically the wiring pattern thereon through the connecting lead wires 16, which are led out through the base casting 10 to a connector 18. This printed circuit board is used to detect the instantaneous position of the rotor through Hall effect devices 20 (FIG. 4) mounted on the surface of the printed circuit board 21 directly below the path of rotation of the rotor. The printed circuit board is mounted on disc drive casting 10. The stator subassembly 24, details of which are shown in FIG. 3, includes a threaded portion 26 which is easily screwed into the mating threaded portion 28 of the base casting 10 inside the region carrying the printed circuit board.

Figure 3:
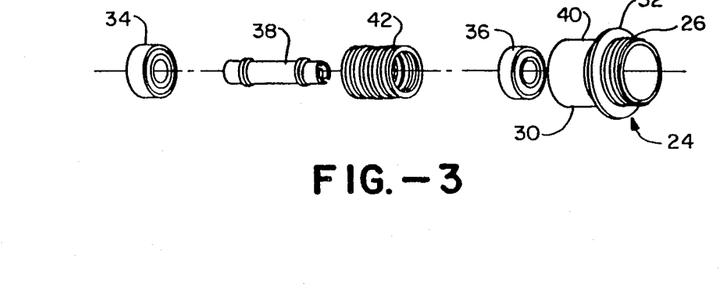
FIG. 3 is an exploded view of the bearing cartridge assembly herein.

Referring to FIG. 3, it can be seen that the essential elements of the stator subassembly, described in greater detail with reference to the sectional view of FIG. 4, comprise the housing tower 30, which includes the threaded portion 26 on the base thereof, and a flange 32 that seats down against the base casting 10. FIG. 3 also shows the upper and lower ball bearings 34, 36 which are to fit over the upper and lower portions of the shaft 38 inside the tower portion 40 of the overall housing 24. Separation between the upper and lower ball bearings is maintained by the coil spring 42. The shaft 38 is seated in the base 10 and supports the disc carrying hub 52 at its upper end.

Returning to FIG. 1, the remaining elements of the overall assembly comprise a nine slot wound stator 50 which is fastened in place on the outside of the tower shaft 40, and a rotor hub 52. The stator assembly will be explained in greater detail with reference to FIGS. 4-5. The elements of the rotor hub are shown in exploded fashion in FIG. 2 and comprise the hub 54 to which the discs are mounted, and end ring 56 which fits within the hub, a return ring 58 and eight-pole magnet ring 60. The magnet 60 of the rotor is an eight-pole magnet designed in accordance with known techniques to provide in combination with the nine sections of the stator a highly efficient motor having low cogging torque and a highly efficient use of copper and steel in its construction.

Figure 4:
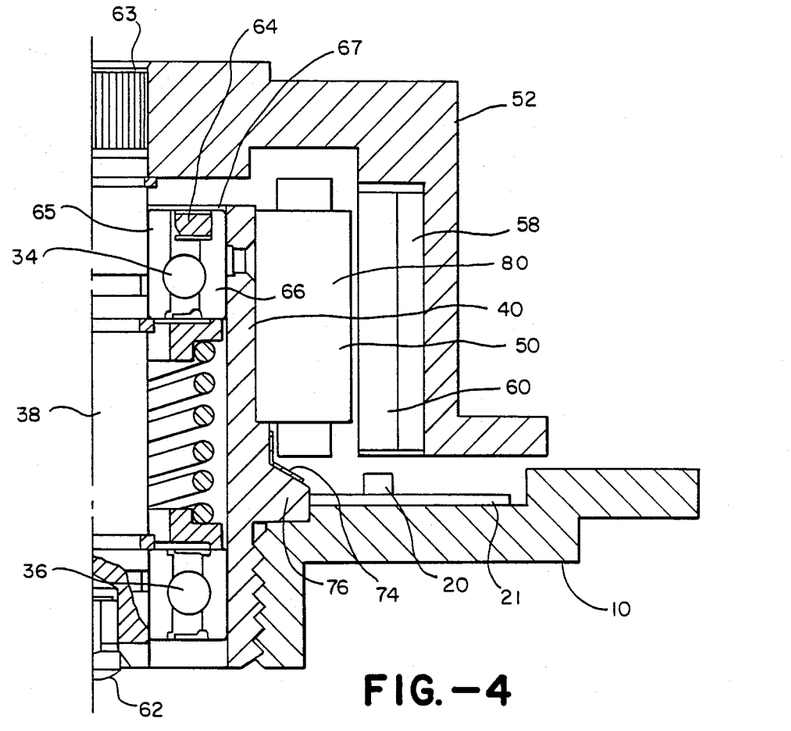
FIG. 4 is a more detailed cross-sectional view of the bearing cartridge herein.

Referring to the details of FIG. 4, the motor shaft 38 is shown surrounded by the upper and lower bearings 34 and 36 which support the shaft 38 for rotation. A ground button 62 is provided on the end of this shaft to prevent static charge buildup. The hub is mounted on the upper end of shaft 38 at 63. As the stator coils 80 are selectively energized, the rotor 60 disc carrying and shaft 38 rotate at a constant speed as required in a disc drive.

The upper ball bearing 34 which is an integral assembly includes a magnetic seal 64 as an integral part thereof. This is provided in order to concentrate the magnetic return path. Since the inner race 65 of the upper bearing rotates with the shaft, while the outer race 66 remains stationary, a magnetic fluid may be placed in a small channel 67 adjacent the outer shaft in order to concentrate the magnetic return path.

The stator 50 is bonded to the outer surface of the housing tower 40 which surrounds shaft 38. The structure of the stator and its winding pattern appears clearly in FIGS. 6-7 and will be explained below.

An insulator 74 is provided at the lower portion of the tower 40. It is mounted on flange 76 of the tower 40 adjacent the stator laminations 50 to eliminate possible shorting of the stator 50 against the steel material of the housing tower 40.

Figure 5:
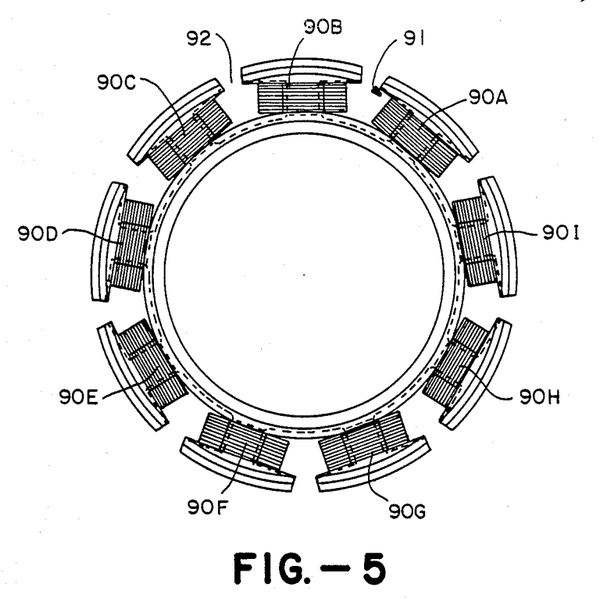
FIG. 5 illustrates the windings of the coils on the stator herein and illustrates the spacing provided by the relatively wide slots between adjacent windings.

FIG. 5 is a plan view of the stator showing the spatial arrangement of the windings 90A-I that form the stator 50. The windings 90 are wound around support forms 91 bonded to the upper portion of the housing as shown in FIG. 4.

Figure 6:
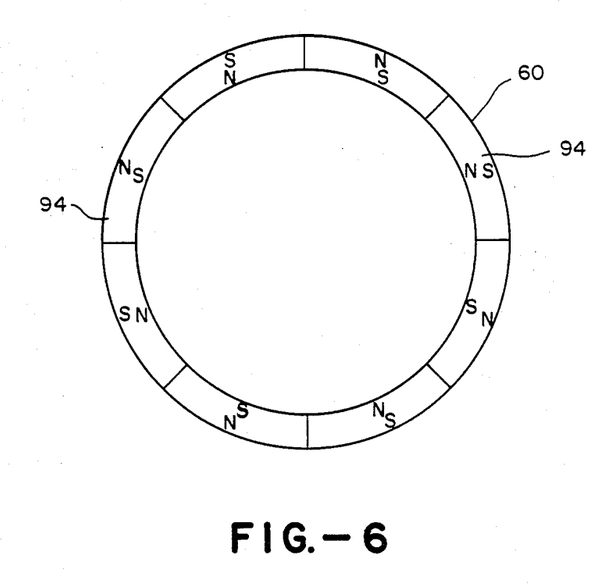
FIG. 6 is a plan view of the eight-pole rotor magnet of this invention.

Each winding 90 is well separated from the next adjacent winding 90 by a relatively wide slot 92. This stator winding arrangement mounted on a stack facing a rotor 60 rotating outside the stack, the windings can be very easily assembled, resulting in a maximum efficient use of the copper in the windings. The rotor is shown in FIG. 6, and comprises eight poles 94, each identified by letters N, S which indicate the radial orientation of the poles. By adopting this design, with each pole taking up 45° and providing a radial flux orientation, the deficiency of prior art designs that used skewed magnetic structures to reduce cogging torque are avoided.

Figure 7:
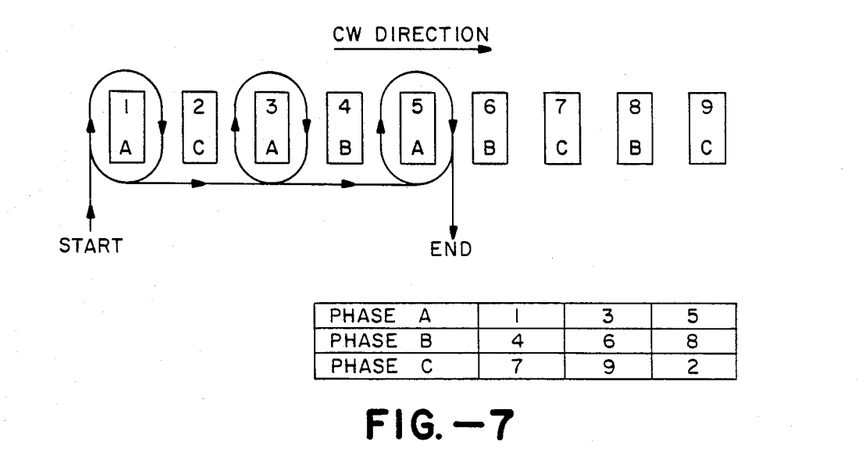
FIG. 7 illustrates the winding sequence of this invention.

The winding sequence of this invention is shown in FIG. 7. As clearly shown in this Figure, given the nine windings, the first phase, Phase A, is connected using windings all connected in the clockwise direction, starting with any first pole which may be considered one, and then incorporating poles n+2 3) and (n+4)5. In order to provide the necessary 120° phase shift, the next phase starts with pole 4 (or original pole n+3) and includes poles 6(n+5) and 8(n+7). The final phase includes poles 7(n+6) and 9(n+8) and to complete the sequence, pole 2(n+1). By using this sequence, it has been found that a minimal cogging torque occurs, and a low ripple motor output is achieved.

Figure 8:
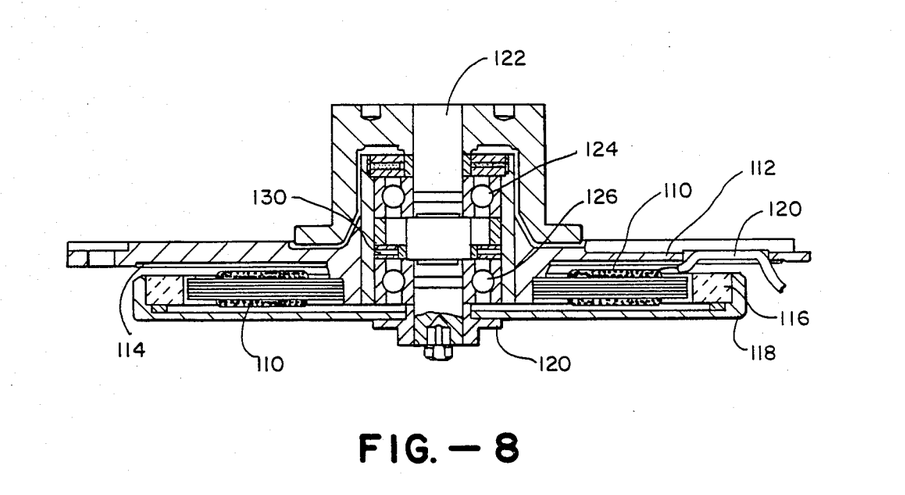
FIG. 8 is a vertical sectional view of an alternative embodiment of a nine-slot, eight-pole motor mounted below the housing casing.
Figure 9:
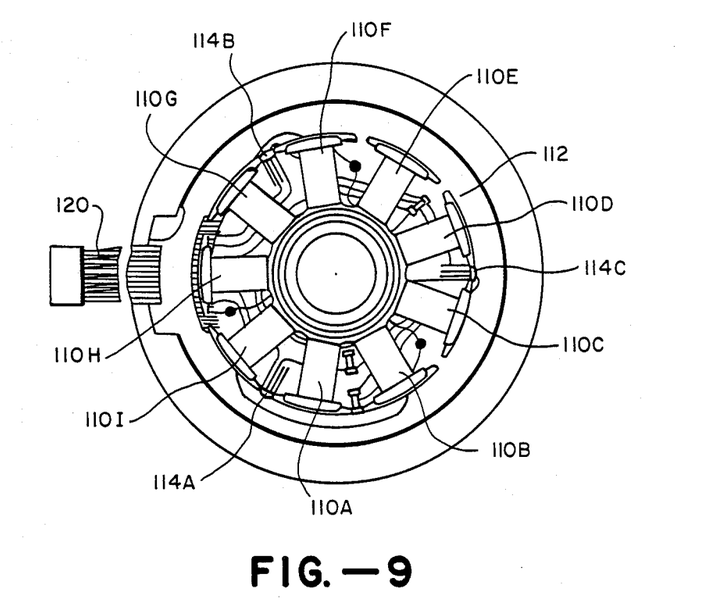
FIG. 9 is a sectional plan view of the motor of FIG. 8 showing the location of the windings.

An alternative embodiment of a nine-slot, eight-pole configuration that incorporates the advantages of this invention is shown in FIG 8. In this figure, it can be seen that the coils 110 are wound over spindle laminations 112 mounted below the base 114 of the disc drive housing. The rotor magnet 116 is radially aligned with the stator and forms an annulus rotating outside the stator. The annular magnet 116 is carried in a shallow, cup-shaped housing 118 whose inner portion is supported on flanges 120 of a rotating shaft 122. The shaft, supported on axially adjacent bearings 124, 126 extends up through the base casting 114 to carry the hub 128 which will have the discs for the disc drive mounted on its outer surface. As described in the incorporated patent application, the bearings 124, 126 are biased into position against the shaft 122 by Belville springs 130. This embodiment incorporates the advantages of the above-described nine-winding, eight-magnetic pole motor. It is especially useful in disc drives where a reduced profile is an important objective. Further, the location of the rotor and stator below the base plate of the disc drive places these portions of the motor outside the disc drive housing and seals them away. FIG. 9 is a plan view of the disc drive of FIG. 8, especially intended to illustrate the spacing of the stepper coils 110A-I.

The location of the printed circuit board 112 that carries the necessary control electronics to drive the spindle motor is also shown in this view as well as the location of the three Hall effect devices 114A,B,C, used to monitor the rotation of the motor. This figure also illustrates the manner in which the lead wires 120 which run to the spindle motor coils are brought into the coils as the rotor and stator coils. As also shown in FIG. 8, these wires 120 are lead up through the printed circuit board 112 to be brought past the rotor, and then dropped back down through an opening in the printed circuit board 112 adjacent to the stator coils and above the edge of the laminations in order to allow the wires to be connected to stator coils 110.

Figure 10A:
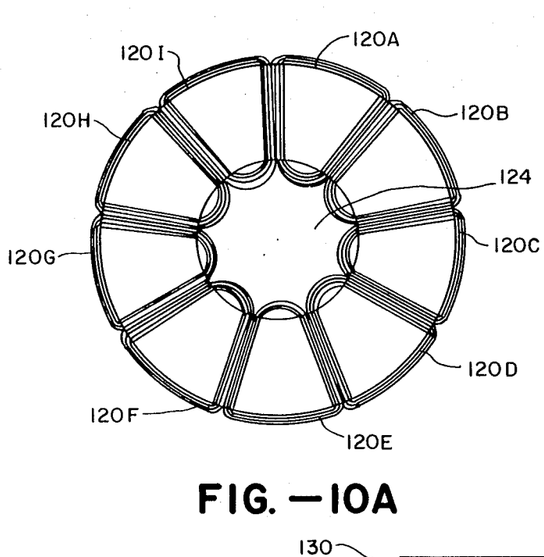
FIGS. 10A, B and C illustrate an axial gap configuration nine-slot, eight-pole spindle motor designed in accordance with this invention.
Figure 10B:
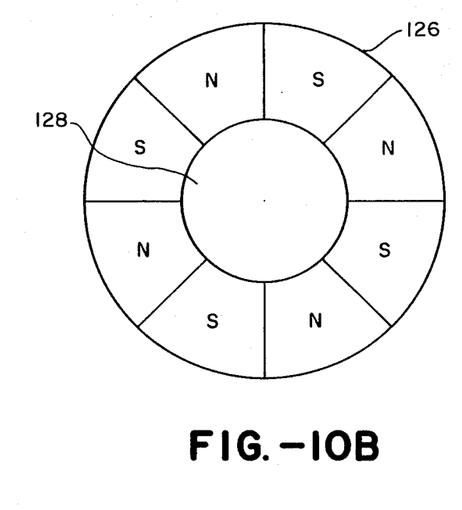
Figure 10C:
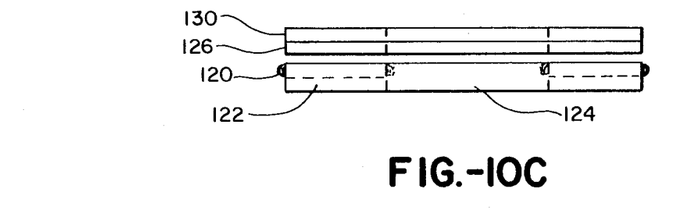

An alternative to the embodiment in FIGS. 8 and 9 is shown in FIG. 10A, B, and C. These figures show the essential elements necessary to assemble an axial gap configuration nine-slot, eight-pole motor. FIG. 10A shows the stator for the motor, comprising nine generally triangular, or wedge shaped planar form windings 120A-I. The windings 120 are mounted on a winding support 122 surrounding a bore 124 which comprises an opening for the shaft. The eight-pole rotor magnet 126, which is a flat magnet with a bore 128 for mounting the magnet on the shaft, is shown in FIG. 10B. The magnet 126 and its steel return path disc 130 are shown mounted back to back in FIG. 10C. The rotor and stator are shown here mounted in parallel planes to minimize the height of this portion of the motor while maximizing the motor torque to be produced with the changing sequence of energization of the coil 120.

Figure 11:
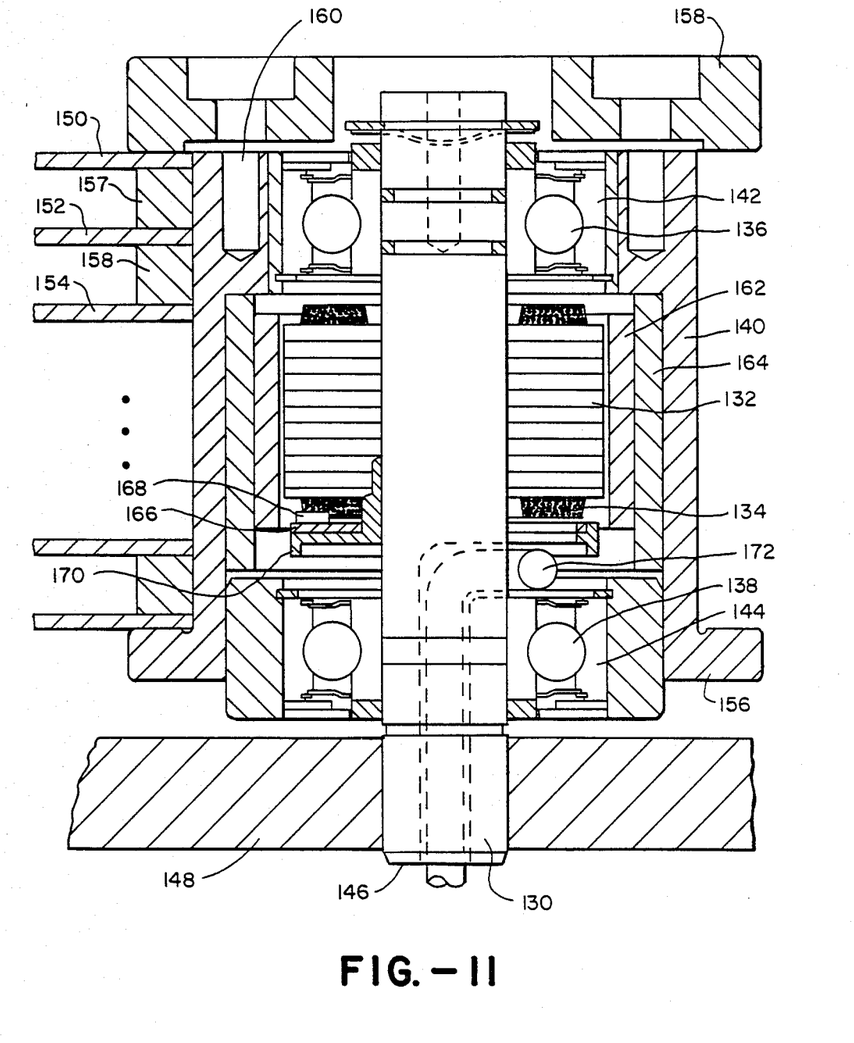
FIG. 11 is a vertical sectional view of an alternative embodiment of the motor shown in FIG. 4.

One final embodiment of a motor incorporating the nine-slot, eight-pole design is shown in FIG. 11. In this design, the shaft 130 is stationary. The shaft supports stator laminations 132 bonded to its outer surface and the stator windings 134. The windings are formed and the laminations shaped to provide the space coil structure especially clearly shown in FIG. 9 of a previous embodiment.

The upper and lower ends of the shaft 130 have bearings 136, 138 attached thereto, with the disc drive support hub 140 rotating on the outer race 142, 144 of these bearings. The lower end generally indicated at 146 of the shaft is fixed in the base casting 148 of the disc drive housing.

The hub 140 which supports the discs 150, 152, 154 has a flange 156 at the lower end thereof. The discs are captured between this flange 156 and a disc clamp 158 held in place by clamping bolts not shown inserted in threaded openings 160 in the top surface of the disc clamp. The spacing between vertically adjacent discs is fixed by spacers 156, 158. The interior surface of the aluminum hub carries an eight-pole magnet 162 and an annular steel plate 164 which forms the magnetic return path for the magnetic flux. The magnet and return path are carried in the hub in the region adjacent the stator to cause rotation of the hub width of the hub 140 with selective energization of the stator windings 134 as discussed above. The printed circuit board 166 carrying the motor electronics and the Hall devices 168 for detecting motor position are mounted on a flange 170 secured to the outer surface of the stationary shaft above the lower bearing 138. The wires to the coils and the Hall devices are lead up through the hollow center of the stationary shaft and connected to the stationary Hall devices and stator coils through an opening 172 leading from the hollow center to the outer surface of the shaft.

In summary, while several embodiments of spindle motor are described, all have in common a nine-slot, eight-pole design for the stator windings and rotor magnet, resulting in ease of assembly, especially in winding the stator coils, efficient use of materials, and a motor with the capability of achieving the necessary high, stable speeds required of disc drives spindle motors with high efficiency and low cogging torque.

Modifications of this invention may occur to a person of skill in the art who studies this disclosure. Therefore, the scope of this invention is to be limited only by the following claims.

What is claimed:

1. In a disc drive comprising a casting having a base portion supporting a spindle motor for rotating a hub supporting one or more discs, said spindle motor comprising a central support shaft having one end supported in said base and a second end supporting said hub for rotation thereon,
   a housing surrounding said shaft and mounted in said base portion,
   a stator mounted on said housing comprising nine windings of equal cross-section separated by slots,
   a magnetic rotor supported within the hub having eight equally spaced poles radially oriented with respect to said stator and said central support shaft,
   said rotor windings being connected to define first, second and third phases, said first phase comprising the first, third and fifth of said nine windings, the second phase comprising the fourth, sixth and eight of said nine windings, the third phase comprising the seventh, ninth and second of said nine windings, the three windings of each phase being connected in series to define a spindle motor having low cogging torque.

2. In a disc drive as in claim 1, a spindle motor wherein the housing is column-shaped and includes an upper portion supporting the stator and a lower portion having an outer threaded surface mating with a correspondingly threaded bore surface in said base, whereby the motor may be easily inserted in the base.

3. In a disc drive as in claim 1, said housing including a flange on the outer surface of said housing, said base casting including a recess for seating the flange to position and support the housing.

4. In a disc drive as in claim 3, upper and lower bearing located on said shaft for supporting said shaft for rotation within the housing, the lower one of said bearings being located on the shaft adjacent to the threaded portion of the casting, the upper one of the bearings being located between the shaft and the stator laminations.

5. A disc drive as claimed in claim 4 including spring means surrounding said shaft and located between the bearings for maintaining the separation of the bearings.

6. In a disc drive as in claim 1, said housing including a flange on the outer surface of said housing, said base casting including a recess for seating the flange to position and support the housing.

7. A disc drive as claimed in claim 6, said housing including a flange on the outer surface of said housing, said base casting including a recess for seating the flange to position and support the housing including a printed board mounted on said base casting surrounding said shaft, said printed circuit board supporting a plurality of Hall effect devices mounted below the path of the rotor for detecting the rotary position of said rotary.

8. A disc drive as in claim 1 wherein said stator elements are supported on the outside of said housing and separated from each other by relatively wide slots whereby the stator may be easily wound.

9. A disc drive as in claim 1 wherein the rotor comprises eight magnets each occupying about 45° of a circular array pattern, the poles of each of said eight magnets being ordered to establish a radial flux orientation.

10. A disc drive as claimed in claim 9, said housing including a flange on the outer surface of said housing, said base casting including a recess for seating the flange to position and support the housing including a printed board mounted on said base casting surrounding said shaft, said printed circuit board supporting a plurality of Hall effect devices mounted below the path of the rotor for detecting the rotary position of said rotary.

11. A disc drive as in claim 10 wherein said stator elements are supported on the outside of said housing and separated from each other by relatively wide slots whereby the stator may be easily wound.

12. In a disc drive as in claim 11, said housing including a flange on the outer surface of said housing, said base casting including a recess for seating the flange to position and support the housing.

13. A disc drive as claimed in claim 12 including spring means surrounding said shaft and located between the bearings for maintaining the separation of the bearings.

14. In a disc drive including a housing base casting for supporting a spindle motor, a spindle motor for rotating a hub supporting one or more discs, said spindle motor comprising a shaft supporting a hub for rotation in said housing, bearing means for supporting said shaft in said base casting, a relatively shallow cup-shaped rotor housing carried on said shaft and supporting a flat rotor for rotation with said shaft and located on the opposite side of said base casting relative to said discs, said rotor supporting an eight-pole magnet, a stator supported below said base casting comprising nine stator windings in a fan-shaped array, means for causing selective energization of said stator windings causing rotation of said rotor, said shaft and said disc carrying hub, said spindle motor configuration of eight poles and nine windings defining a motor having a low cogging torque.

15. A disc drive as in claim 14 wherein said magnet is annular in shape and rotates outside of said stator windings to minimize the height of said spindle motor.

16. A disc drive as in claim 14 wherein said magnet is flat and is supported by said rotor below an axial gap configuration of said stator windings.

17. A disc drive as in claim 16 wherein said stator windings are planar generally triangular windings.

18. A disc drive as claimed in claim 14, said housing including a flange on the outer surface of said housing, said base casting including a recess for seating the flange to position and support the housing including a printed board mounted on said base casting surrounding said shaft, said printed circuit board supporting a plurality of Hall effect devices mounted below the path of the rotor for detecting the rotary position of said rotary.

19. A disc drive as claimed in claim 18 wherein said shaft is supported by a pair of bearings located between said rotor and said hub, and spring means separately said bearings and biasing the bearings to support the shaft for stable rotation of said hub and rotor.

20. A disc drive as claimed in claim 19 wherein said stator windings are wound on finger-shaped forms extending out from a support surrounding said shaft, said forms being regularly spaced around said shaft to provide easy winding of said stator windings on said form.

21. In a disk drive comprising a casting having a base portion supporting a spindle motor for rotating a hub supporting one or more discs, said spindle motor comprising a central support shaft having one end supported in said base and a second end supporting said hub for rotation thereon, a housing surrounding said shaft and mounted in said base portion, a stator mounted on said housing comprising nine windings of equal cross-section separated by slots, and a magnetic rotor supported within the hub having eight equally spaced poles radially oriented with respect to said stator and said central support shaft, said disc drive motor having low cogging torque.

* * * * *